Figures 1, 2, 3:
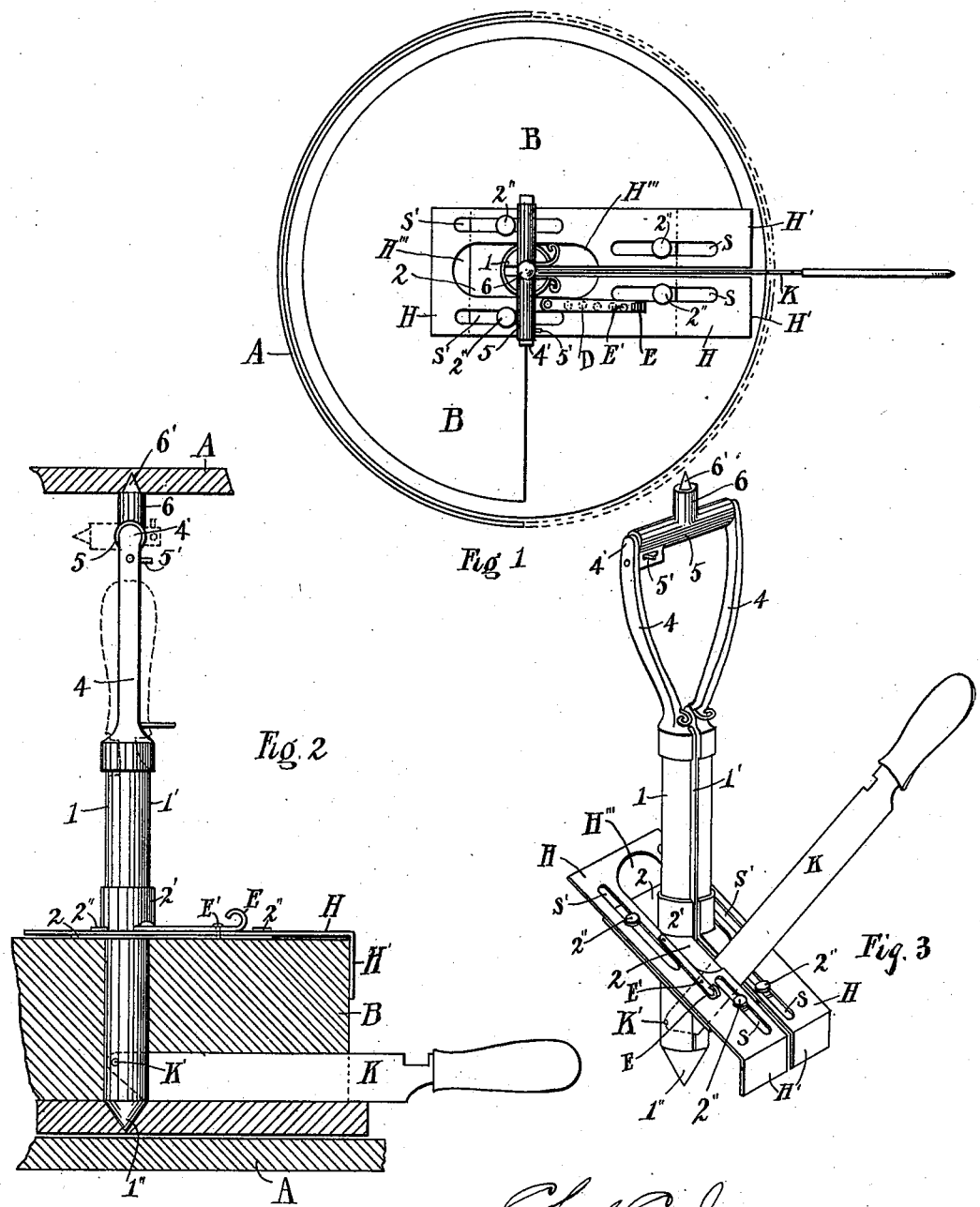

(No Model.)

C. C. IRVING & J. McKAY.
CHEESE KNIFE.

No. 548,315. Patented Oct. 22, 1895.

WITNESSES:

INVENTORS
Charles C. Irving
Joseph McKay
BY
ATTORNEY

UNITED STATES PATENT OFFICE.

CHARLES C. IRVING AND JOSEPH McKAY, OF ESSEXVILLE, MICHIGAN.

CHEESE-KNIFE.

SPECIFICATION forming part of Letters Patent No. 548,315, dated October 22, 1895.

Application filed February 12, 1895. Serial No. 538,106. (No model.)

*To all whom it may concern:*

Be it known that we, CHARLES C. IRVING and JOSEPH McKAY, citizens of the United States, residing at Essexville, in the county of Bay and State of Michigan, have invented certain new and useful Improvements in Cheese-Knives; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention is a cheese-knife; and it consists in the arrangement and combinations shown and described.

Figure 1 is a plan view of the device. Fig. 2 is an elevation of the same. Fig. 3 is a perspective view.

In the drawings, A is the cheese-box top and bottom.

B is the cheese.

1 is a hollow tube having a longitudinal slot 1', in which a knife K is inserted and sheathed in the tube, as shown.

K' is a pivot pivoting the lower end of the knife K in the lower end of the tube 1, the pivot being near the back edge of the knife and through a segment of the tube.

The lower end 1'' of the tube 1 is pointed, as shown, for the purpose of engaging the bottom of the box. The upper end of the tube 1 is forked, as at 4, to permit grasping the handle of the knife K with the hand when the knife is in its sheath. Connecting the upper ends of the forks 4 is the bar 5, being pivoted in the forks 4, but held in an upright position by the thumb-catch 5', engaging a hole in one of the forks when the bar is turned in a certain position.

6 is a pointed lug on the bar 5 midway of the two forks. This lug 6 is intended to engage the top of the box when the knife is placed in position for use, as shown in Fig. 2— viz., after the cheese has been placed within the box the sheath with its knife sheathed therein is pressed through the center of the cheese and into the bottom of the box, as shown. Then the bar 5 is turned so that the point 6' of the lug 6 will engage the top of the box, in which position it will be held by the thumb-catch 5', thus preventing the sheath from raising out of the cheese as the knife K is turned down, cutting through the cheese.

In order to prevent the cheese from being pushed away from the knife as it is being cut and also to guide the knife for a certain distance when cutting, we arrange a brace H, having the right-angled flange H' at its end, which brace is secured to a loose collar 2' on the tube 1 and rests upon the top of the cheese, with the flange H' engaging the outer edge of the cheese. There are two of these braces, one upon each side of the knife K, and they may be adjusted to any size of cheese.

In the drawings we have shown the adjustable brace. 2 is a plate secured to the loose collar 2' and extends laterally each side of the knife for the proper distance. To this plate 2 we secure the braces H by means of set-screws 2'' through longitudinal slots S S and S' S'. This permits the braces to be moved out or in, according as the cheese is large or small. E is a spring-catch secured to the top of the brace and having a lug E', adapted to engage holes D in the plate 2, arranged underneath it in the line of its movement as the brace is moved. Raising the end of the catch E lifts the lug E' out of a hole and permits the brace to be moved. By this arrangement it will be seen that the knife and cheese are firmly held in position while the cheese is being cut. After one slice has been cut the knife is raised and the sheath 1 turned, so that the knife will again engage the cheese, the degree turned depending upon the amount required to be cut, small or great.

It is also obvious that a scale can be arranged upon the brace designating the degree the knife should be turned to cut a certain quantity of cheese; but as different cheeses vary in weight this is not always reliable.

Having thus described our invention, what we claim as new, and desire to secure by Letters Patent, is—

1. A cheese knife consisting of a blade, a sheath for the blade having a longitudinal opening in front of the knife blade, a pivot in the lower end of the sheath passing through the sheath and the point of the blade, the sheath having a pointed end adapting it to be pressed through the center of the cheese, a loose collar on the sheath, a brace secured to the collar and extending to the edge of the cheese and having a depending flange engaging the outer edge of the cheese, thereby holding the cheese to the blade, and means as described for holding the blade in the cheese as it is cut, substantially as described.

2. The combination with a blade pivoted in the lower end of a sheath, of the sheath adapted to be pressed through the center of the cheese and to be turned therein, a loose collar on the sheath, an adjustable double brace secured to the collar and extending to the edge of the cheese, a depending flange on the edge of the brace engaging the outer edge of the cheese, the braces being on each side of the blade and forming a guide for it as well as holding the cheese to the blade, substantially as described.

3. In a cheese knife, the combination with a blade pivoted in the lower end of a sheath, and the sheath adapted to be passed through and be turned in the center of a cheese, and engaging the bottom of a cheese box, of adjustable braces secured to a loose collar on the sheath, the braces extending to the edge of the cheese and having depending flanges engaging the outer edge of the cheese, the braces forming a guideway for the knife, and means for securing and holding the sheath in the cheese as the blade is operated, substantially as described.

In testimony whereof we affix our signatures in presence of two witnesses.

CHARLES C. IRVING.
JOSEPH McKAY.

Witnesses:
J. F. O'KEEFE,
A. H. SWARTHOUT.